United States Patent [19]

Ahlen

[11] 4,061,207

[45] Dec. 6, 1977

[54] MODULATING ARRANGEMENT FOR SERVO-MOTOR ACTUATED DISC BRAKE

[75] Inventor: Karl Gustav Ahlen, Stockholm, Sweden

[73] Assignee: S.R.M. Hydromekanik Aktiebolag, Stockholm-Vallingby, Sweden

[21] Appl. No.: 617,643

[22] Filed: Sept. 29, 1975

Related U.S. Application Data

[63] Continuation of Ser. No. 366,168, June 1, 1973, abandoned.

[30] Foreign Application Priority Data

Mar. 21, 1973 United Kingdom ............... 13599/73

[51] Int. Cl.$^2$ .......................................... F16D 65/853
[52] U.S. Cl. ............................... 188/264 E; 188/71.6; 188/264 B; 192/113 B
[58] Field of Search ............ 188/71.6, 264 R, 264 B, 188/264 E, 264 F; 192/113 B

[56] References Cited

U.S. PATENT DOCUMENTS

| | | | |
|---|---|---|---|
| 2,407,699 | 9/1946 | Hill | 188/264 F |
| 2,409,099 | 10/1946 | Bloomfield | 188/264 E |
| 2,869,701 | 1/1959 | Yokel | 192/113 B |
| 3,351,169 | 11/1967 | McIndoe | 192/113 B |
| 3,540,557 | 11/1970 | Hasselbacher | 188/264 E |
| 3,690,429 | 9/1972 | Honda | 192/113 B |

FOREIGN PATENT DOCUMENTS

701,725   12/1953   United Kingdom ............ 188/264 E

Primary Examiner—Trygve M. Blix
Assistant Examiner—Edward R. Kazenske
Attorney, Agent, or Firm—Larson, Taylor and Hinds

[57] ABSTRACT

Pressurized oil is delivered into the space containing the friction surfaces of a servo-motor actuated disc brake, such delivery being momentary and in response to the delivery of pressurized fluid to the servo-motor itself. Such oil into the space serves to retard the engagement of the friction surfaces, and also to lubricate and cool the same. The arrangement may include a cylinder having a movable member responsive on one side to the pressurized fluid going to the servo-motor for pushing oil via a maximum pressure valve to the space. The brake may be a control for the guide member of a double rotation torque converter.

3 Claims, 1 Drawing Figure

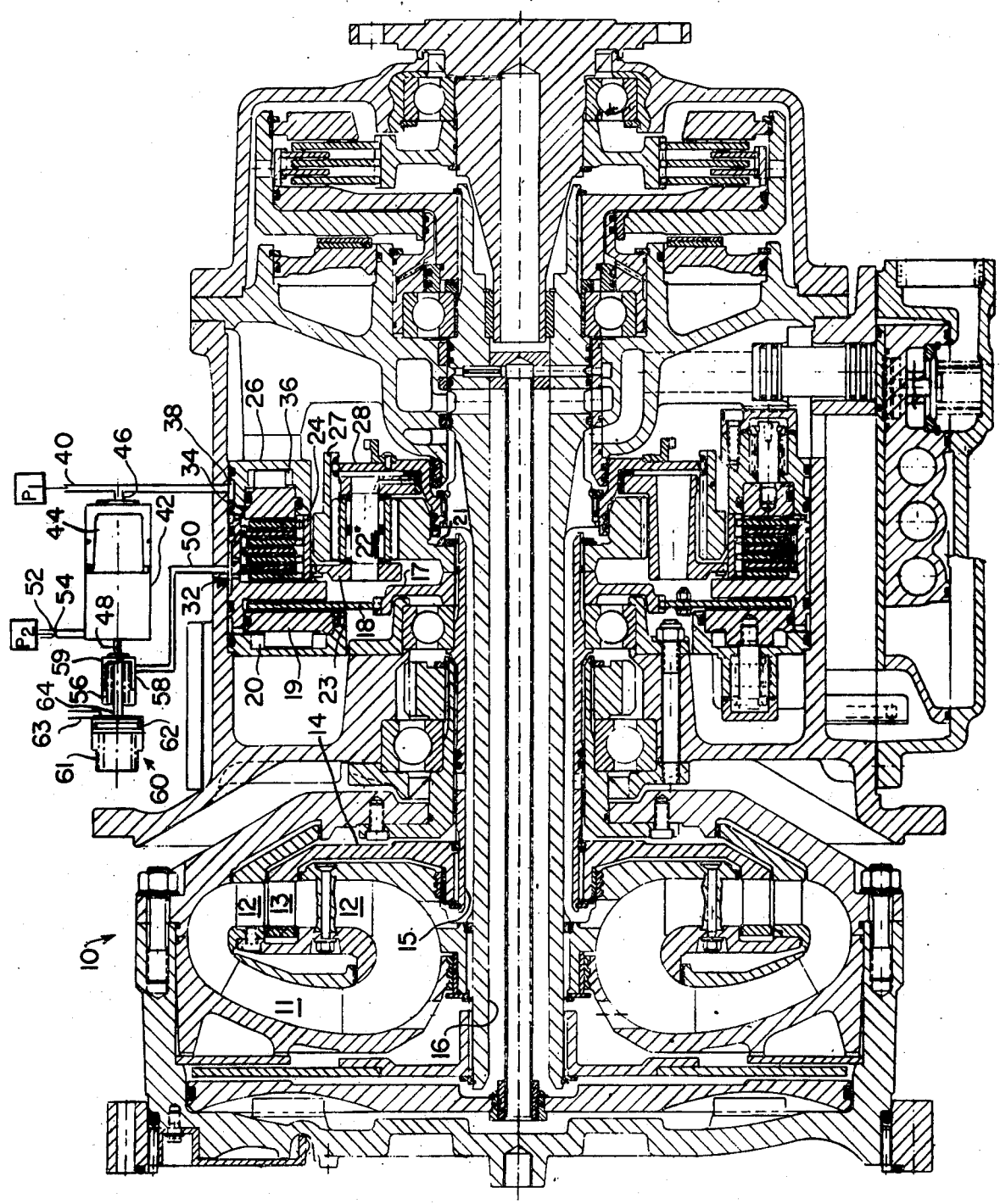

MODULATING ARRANGEMENT FOR SERVO-MOTOR ACTUATED DISC BRAKE

This is a continuation of application Ser. No. 366,168 filed June 1, 1973 now abandoned.

BACKGROUND OF THE INVENTION

This invention relates to friction brakes such as disc brakes, which brakes are actuated by a servo-motor operated by pressure oil, and more particularly to an arrangement for producing temporarily a soft connection of the friction surfaces.

When connecting the friction surfaces of a disc brake actuated by a pressure oil servo-motor, there is often difficulty in avoiding pressure peaks and torque peaks. It is frequently desirable that the connection of the brake discs during a definite period should allow slip in oder to provide a definitely soft connection with limited torque. In general this problem has been solved by providing a pressure modulating arrangement on, or in connection with the servo-motor which for normal purposes may be said to be acceptable although it is not a good solution.

The problems described in the preceding paragraph are of particular importance in the friction brakes associated with the operation of a hydraulic torque converter such as for example the friction brake which controls the operation of the guide member.

SUMMARY OF THE INVENTION

Thus, it is a purpose of this invention to provide a new and improved arrangement for modulating i.e. retarding the engagement of friction surfaces of a brake such as a disc brake.

This purpose is attained by feeding oil during a limited period into the space containing the friction surfaces such as the brake discs which to a predetermined degree counterbalances the connecting force of the servo-motor while simultaneously lubricating and cooling the brake discs. The modulated connection is operative for a strictly limited time without any risk of reducing the servo-motor oil pressure even on completion of the connection.

According to one feature of the invention in a modulating arrangement for a friction disc brake actuated by a pressure oil servo-motor, the pressure oil actuating the brake servo-motor also actuates a pump feeding oil into a space containing the brake discs.

The arrangement includes a pump cylinder communicating at one end with a feed pipe of the brake servo-motor and at the other end communicating with the space containing the brake discs, said other end also communicating with a source of reference oil pressure, whereby when the servo-motor is fed with pressure oil a movable member of the pump such as a piston within the cylinder is displaced and the oil present in the other end of the cylinder is discharged into the space containing the brake discs to build up a pressure between the brake discs and the respective connection surfaces. The invention has the additional advantage that the oil entering said space cools and luricates the brake discs during the period of discharge from the cylinder.

When the servo-motor is inoperative and relieved from pressure oil, the pump piston due to pressure from the reference oil supply will return slowly to said one end of the cylinder and the cylinder will become filled with oil. In the pipe connection between the cylinder and the space containing the brake discs is arranged a maximum pressure value which opens at a pressue only just sufficiently high as to cause the return of the piston, whereafter, during the released position of the servo-motor a small amount of oil enters said space for lubrication and also cooling purposes.

It is necessary, particularly for the purpose for which the above arrangement has been developed, that the modulating arrangement is operative only under predetermined conditions. A blocking device has therefore been provided, connected to the maximum pressure value and adapted to be actuated by another pressure source in the case when modulation is not required.

The invention is primarily intended to be used on a high performance torque converter having a so-called double rotation arrangement including a brake for a planetary gear carrier and a lock-up clutch, which for driving purposes functions independently but for hydraulic braking purposes are simultaneously applied. This means that the blocking device is always actuated when direct drive is released but not actuated, leaving the modulating arrangement operative, as soon as direct drive is engaged, whereby modulation of the brake is always obtained when hydraulic braking is connected but not when hydraulic drive is connected.

Thus, it is an object of this invention to provide a new and improved modulating arrangement for a friction brake such as a disc brake.

It is another object of this invention to provide a new and improved arrangement for modulating disc brakes associated with the guide member control means of a hydraulic torque converter.

It is another object of this invention to provide a modulating arrangement for a friction brake such as a disc brake wherein delivery of oil into the spaces between the friction surfaces is accomplished in response to the delivery of pressurized oil to operate a servo-motor of the friction brake.

Other objects and the advantages of the present invention will become apparent from the detailed description to follow, together with the accompanying drawing.

BRIEF DESCRIPTION OF THE DRAWING

The invention will be hereinafter described more in detail by way of example, with reference to the FIGURE shown in the accompanying drawing which is a longitudinal cross-section of a generally known torque converter of the high performance type with double rotation.

DETAILED DESCRIPTION OF THE PREFERRED EMBODIMENT

The FIGURE shows a high performance torque converter 10 having a ring of pump blades 11, two rings of interconnected turbine blades 12 and a ring of guide blades 13, the latter mounted on a guide ring 14 which is in turn connected to a shaft 15 for rotation therewith. The rings of turbine blades 12 are connected to a turbine output shaft 16.

Associated with the guide ring shaft 15 for rotation therewith is a first hub 17 and a second hub 21. Mounted on the hub 17 is a annular disc 18 which is movable axially on the outer periphery of hub 17 and is adapted to be engaged frictionally by a piston 19 pressurized by fluid in space 20 for locking up the guide ring 13 so that the guide ring is stationary relative to the housing.

The hub 21 has an outer splined surface which enages teeth on a plurality of planet gears 22, the latter of which engage the teeth on the interior of ring 27 which is connected for rotation with the turbine output shaft 16. Mounted on the shaft of planet gears 22 are arms 23 which at their outer peripheries are adapted to engage a ring 24 to which are attached discs of a disc brake 32, the other of the discs being attached to a brake housing 26 which is fixed to the stationary casing of the torque converter.

The disc brake 32 is provided for stalling or releasing the planet gear carrier from the stationary casing. This disc brake is actuated by a servo-motor 34 having a space 36 for oil pressure and communicating through a channel 38 and a pipe connection 40, connected to an oil pressure source P1, pressure oil always being supplied when the brake is to be actuated, and always discharged when the disc brake is to be released.

A pump cylinder 42 having a movable member such as a piston 44 is connected on one side of the piston through a pipe 46 to the above mentioned pipe 40, while the cylinder on the other side of the piston communicates through a maximum pressure valve and pipes 48, 50 to a space containing the discs for the brake 32. The latter space is also fed from a reference pressure oil source P2 through a pipe 52 having a restriction 54. The maximum pressure valve includes a spring 56 and a valve member 58. A servo-cylinder 60 is provided to block the maximum pressure valve, positively disconnecting the pipe 48 and the pipe 50 to eliminate the function of the modulating arrangement when desired. As shown in the FIGURE, servo-cylinder 60 contains a piston 62 urged to the right by a spring 61, whereby a rod 64 attached to piston 62 urges valve member 58 against the right end of the wall of the casing, thus blocking communication from line 48 into a space 59 surrounding the right end of the valve 58. The spring 61 is offset in operation by fluid from a line 63 acting on the right side of piston 62.

When pressure oil is fed into the pipe 40, the piston 44, provided that the maximum pressure valve member 58 not closed by servo-cylinder 60 is displaced from one end of the cylinder to the other, forcing the valve element 58 to the left to thus force oil in from the cylinder through line 48 into the space 59 around valve 58 and from there through line 50 to the space containing the disc brake plates, thus building up a counter pressure to the servo-motor 34, and simultaneously lubricating and cooling the plates, whereby the torque absorption capacity of the brake 32 is reduced. The duration of said reduction is limited by the time it takes for the piston 44 to move from one end of the cylinder 42 to the other, the capacity of the cylinder and the resistance between the disc brake plates dependant on the arrangement of the grooves in the plates.

This arrangement ensures slip between the plates for a fairly exactly determined torque and for a limited period simultaneously with the injection of an adequate supply of cooling oil to limit the temperature of the plates.

Further, by the arrangement according to the invention, it can be decided at which connection of the brake the torque limiting device should act and not act, or alternatively different steps of modulation can be obtained by modifying, by means of the servo-cylinder 60, the opening pressure for the maximum pressure valve. After each disconnection of the brake the system is re-set to its starting position by feeding the cylinder at the end connected to the space containing the brake discs with oil from a reference pressure source.

The modulating arrangement according to the invention thus includes firstly, the feature of a connection between the pressure oil supply to the servo-motor actuating the friction brake discs and a pump cylinder which feeds oil into the space containing the brake discs.

Secondly, the feature of resetting the cylinder on each disconnection of the brake by the provision of means to fill the pump space with oil from a reference pressure source and of a maximum pressure valve in the connection between the cylinder and the space containing the brake discs.

And thirdly, the provision of a blocking device for the maximum pressure valve adapted either to stop the functioning of said valve or to modify the time of action of the modulating arrangement.

Although the invention has been described in considerable detail with respect to a preferred embodiment, it will be apparent that the invention is capable of numerous modifications and variations apparent to those skilled in the art without departing from the spirit of the scope and invention.

I claim:

1. A friction brake comprising:

means defining a generally enclosed space containing engaging friction braking surfaces, a fluid operated servo-motor for urging the friction braking surfaces together, said servo-motor defining in part said generally enclosed space, and a retarding means for counterbalancing the urging force of the servo-motor to thus retard the engagement of the braking sufaces as a pressurized fluid is being supplied to the servo-motor, said retarding means comprising means for introducing oil under pressure directly into said generally enclosed space such that said oil under pressure also passes between the friction braking surfaces, the pressure of the oil in said generally enclosed space being sufficiently great to at least partially retard the urging force of the servo-motor tending to bring about engagement of the braking surfaces, said retarding means being operable to introduce said pressurized oil in response to the delivery of said pressurized fluid to the servo-motor to engage the friction braking surfaces and concurrent with the introduction of said fluid to the servo-motor, said retarding means further including limiting means for limiting the time during which the said oil is introduced to said generally enclosed space to only an initial part of the time during which brake engagement is being brought about, and for thereafter permitting reduction of the pressure in the said generally enclosed space to permit the servo-motor to complete the bringing about of brake engagement, said limiting means including a cylinder, a movable member within the cylinder, one side of the movable member being in a fluid communication with the pressurized fluid entering the servo-motor, and the other side of the movable member containing said oil and being selectively in fluid communication along a fluid path with the said generally enclosed space, whereby as the movable member moves from an original position under the force of the pressurized fluid being delivered to the servo-motor, the movable member urges said oil from the cylinder along said path to the said space and including a maximum pressure valve in said fluid path between the said other side of the movable member and the said generally enclosed space, said maximum pressure valve being openable to permit oil to flow therethrough only after the pressure thereagainst exceeds a predeterminable level, and including a further means separate from the movable member for modifying the opening of said maximum pressure valve independently of the movable member.

2. A friction brake according to claim 1, including a source for said oil at a reference pressure in communication with said other side of said movable member for returning the movable member to its said original position after the servo-motor is no longer pressurized.

3. A friction brake according to claim 1, said brake being a disc brake having a plurality of interleaved discs which engage each other upon the operation of said servo-motor.

* * * * *